INVENTOR.
HENRI-GEORGES DOLL
BY Campbell, Brumbaugh, Free & Graves
ATTORNEYS

INVENTOR.
HENRI-GEORGES DOLL
BY
Campbell, Brumbaugh, Free & Graves
ATTORNEYS

United States Patent Office 2,747,401
Patented May 29, 1956

2,747,401

METHODS AND APPARATUS FOR DETERMINING HYDRAULIC CHARACTERISTICS OF FORMATIONS TRAVERSED BY A BOREHOLE

Henri-Georges Doll, Ridgefield, Conn., assignor to Schlumberger Well Surveying Corporation, Houston, Tex., a corporation of Delaware Application May 13, 1952, Serial No. 287,582

22 Claims. (Cl. 73—151)

The present invention relates to methods and apparatus for determining hydraulic characteristics of formations traversed by a bore hole and more particularly to novel methods and apparatus for determining the fluid pressure, the permeability and the degree of hydraulic anisotropy of such formations.

In the production of natural fluids such as oil and gas, wells are drilled many thousands of feet into the earth. When a possible oil or gas bearing formation has been located in a well, as for example by electrical logging methods, it is highly desirable to determine the fluid pressure and the permeability of such a formation in order that the ability of the well to produce may be estimated prior to placing expensive production equipment in the well and at the surface. Further, most permeable formations are hydraulically anisotropic, that is, they have different permeabilities in vertical and horizontal directions respectively, and it is thus desirable that both the vertical and the horizontal permeability be determined for a formation in question.

It is one object of the invention to provide novel methods and apparatus for determining hydraulic characteristics of formations traversed by a bore hole.

Another object of the invention is to provide novel methods and apparatus for determining the permeability of formations traversed by a bore hole.

A further object of the invention is to provide novel methods and apparatus for determining the pressure of the fluid contained in permeable formations traversed by a bore hole.

Yet another object of the invention is to provide novel methods and apparatus for determining the degree of hydraulic anisotropy of permeable formations traversed by a bore hole.

These and other objects may be accomplished in accordance with the invention by creating a pressure gradient in a zone within a selected formation, and determining the fluid pressure at one or more points in the zone. In one embodiment, for example, the static pressure of a selected formation is determined at a given point within the formation. Preferably this measurement is taken by establishing, as by the use of probe means, a fluid communication channel between the point in the formation and a suitable pressure responsive means in a bore hole traversing the formation. The pressure in the formation in the vicinity of the point is changed before, during or after the static pressure measurement to create the pressure gradient zone about the point, as by passing fluid into or extracting fluid from the formation.

Preferably this fluid flow creating the pressure gradient zone is established at a known rate and at a known distance from the measuring point. In certain cases this distance may be zero. The change in pressure at the point resulting from the pressure gradient in the formation is measured, which datum is representative of both the actual and relative permeability of the formation.

If it is desired to learn the permeabilities of the formations in several different directions, thus revealing the degree of hydraulic anisotropy of the formation, these measurements may be made in several different directions.

In order that the invention may be more fully understood, it will be described in conjunction with the following drawings, in which.

Figures 1, 2A, 2B, 3:
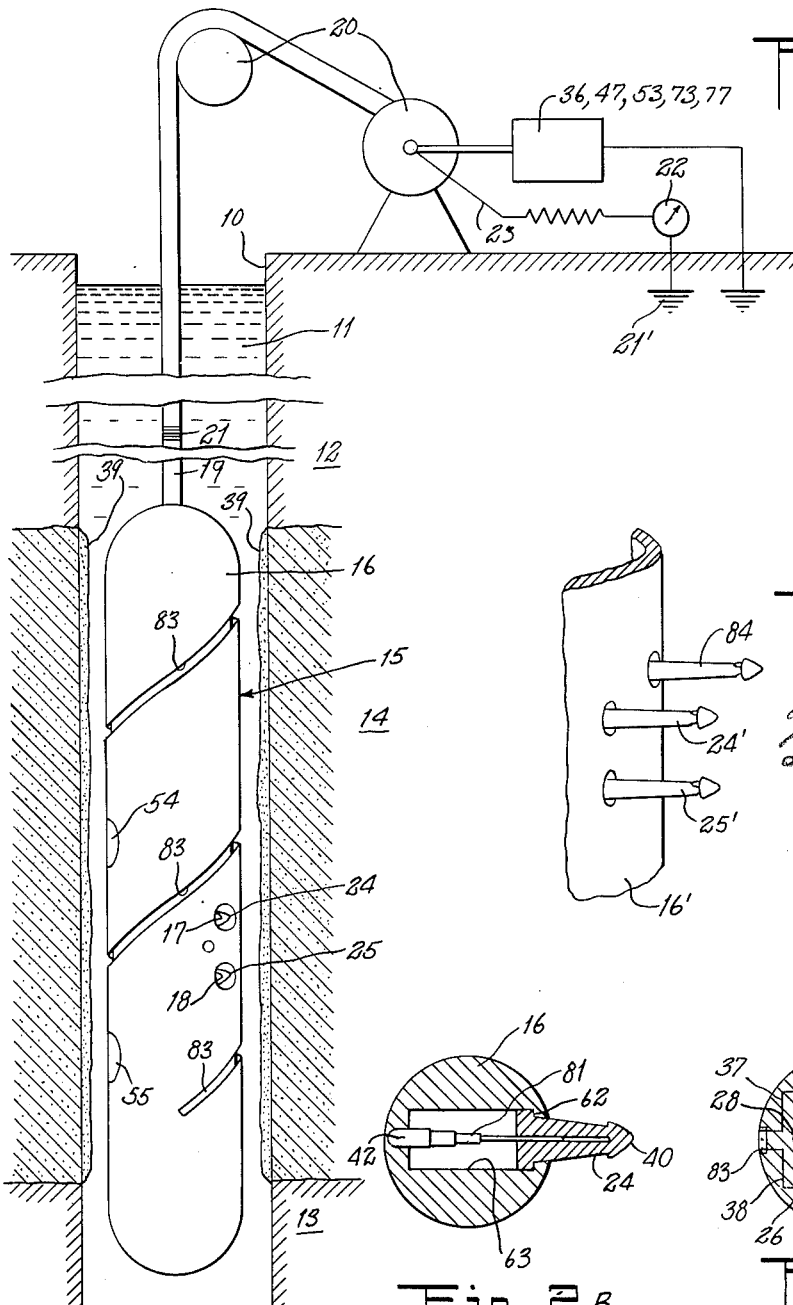
Figure 1 is an exterior, side view of a bore hole instrument, constructed in accordance with the invention, disposed in a bore hole adjacent a formation to be tested.
Figure 2A is a view in transverse section of the embodiment of the invention shown in Figure 2 taken at the line 2A—2A looking in the direction of the arrows, showing a typical pressure responsive device that may be employed in accordance with the invention.
Figure 2B is a second view in transverse section of the embodiment of the invention shown in Figure 2 taken at the line 2B—2B looking in the direction of the arrows.
Figure 3 is a fragmentary view in perspective of a modification of the apparatus shown in Figure 2 whereby the permeabilities of a formation in two different directions may be determined.

In Figure 1 a bore hole 10, filled with drilling liquid 11 is shown as traversing two substantially impermeable formations 12 and 13, and a permeable formation 14. The level, vertical extent, and potential productivity of the permeable formation 14 may have been previously determined by electrical logging methods or by conventional coring, for example. Before expending time and money by placing production equipment from the surface to the formation 14, it is highly desirable to determine the hydraulic characteristics, i. e. pressure, permeability, and degree of anisotropy of the formation 14, to ascertain if commercial production is a possibility.

To this end an instrument 15, which will be described below and which is incorporated in a cylindrical housing 16, is located in the bore hole 10 with its probe ports 17 and 18 disposed at the level of the formation 14 by lowering it on an electric cable 19 from a winch 20. The level may be determined in any suitable way such, for example, as comparing the length of cable 19 lowered in the bore hole 10 with the depths on a conventional core record or by correlating a previously run electrical log with spontaneous potentials derived from an electrode 21 wound on the cable 19 a measured distance from the instrument, which potentials may be observed by means of an indicating device such as a high impedance galvanometer 22 at the earth's surface grounded at 21' and connected to the electrode 21 through an insulated cable conductor 23.

Figure 2:
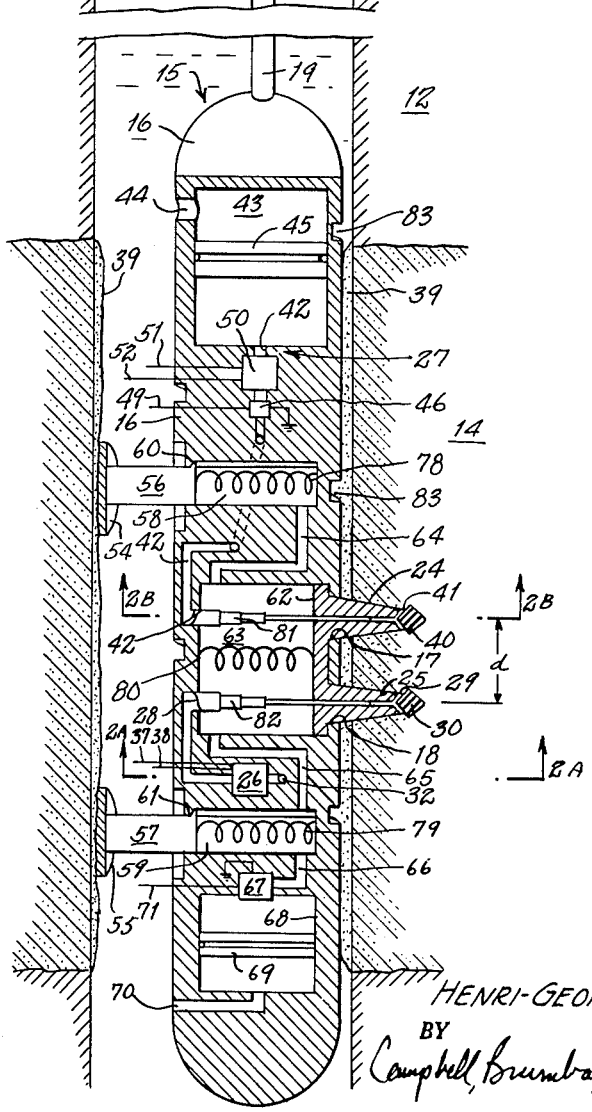
Figure 2 is a view in longitudinal section, partly schematic, of a representative embodiment of the invention during a test of a formation traversed by a bore hole.

The instrument, as illustrated in Figures 1 and 2, includes a pair of probes 24 and 25 mounted in the probe ports 17 and 18 for movement between withdrawn and extended positions; a pressure responsive device 26 connected to the probe 25; and pressure changing means 27 connected to the probe 24. The probes 24 and 25 are preferably formed from a metal able to withstand the forces encountered in penetrating the formation 14 as set forth below.

By means of the probe 25 and the pressure responsive device 26 the pressures at a point within a formation may be measured and if desired this may be done continuously over a desired interval of time. This is accomplished in accordance with the invention by providing a fluid conduit 28 which places one or more openings 29 formed near the tip 30 of the probe 25 in communication with one side of the pressure responsive device 26.

As shown in Figure 2A, the pressure responsive device 26 may comprise a cylindrical chamber 31 in the housing 16, one end of which opens into the channel 28 and the other end of which opens into a second channel 32, which provides communication between a reference pressure source, such as the drilling or bore hole liquid at a port formed in the surface of the housing 16, and the chamber 31. A flexible metal diaphragm 34 may be stretched across the chamber 31, isolating the channel 28 from the channel 32. Accordingly, when the probe 25 is inserted in the formation 14, the difference in pressure between the drilling liquid at the reference pressure source or port 33 and the fluid in the formation at the probe tip 30 will be applied across the flexible diaphragm 34. The relative strain on the diaphragm 34 may be translated into electrical signals by means of a conventional electrical strain gauge 35 and the signals transmitted to a suitable indicating device 36 at the surface by means of insulated conductors 37 and 38. The indicating device 36 is preferably calibrated directly in units of pressure, and thus, after an equilibrium has been reached, the device 36 will give a direct indication of the difference in pressure between the fluid in the formation 14 and the drilling liquid 11 at the same level, from which the actual formation pressure may be readily determined.

In good drilling practice, the drilling liquid 11 in the bore hole 10 opposite the permeable formation 14 is at a greater hydrostatic pressure than the fluid in the formation 14. Thus, as is well known, a substantially impermeable mud cake 39 forms on the wall of the bore hole 10 within the permeable formation 14. Since the mud cake 39 is almost impermeable, substantially the entire pressure differential between the fluid in the formation 14 and the drilling liquid 11 at the same level exists across the mud cake 39.

If desired, the channel 32 of the pressure responsive device 26 may be made to communicate with a reference pressure source such as a relatively large tank (not shown) containing fluid at atmospheric pressure and the indicating device 36 will thus give a direct indication of the actual pressure in the formation. In certain cases the reference pressure source may be established within the formation itself, as will be described more fully below. It will be understood that in lieu of the pressure responsive device shown in Figure 2A, any suitable manometer giving electrical pressure indications may be employed.

In accordance with the invention the second test probe 24 having a tip 40 may be inserted into the formation 14, preferably to the same lateral extent as the probe 25. The tip 40 of the probe 24 is thus at a known, relatively short distance $d$ from the tip 30 of the probe 25. One or more openings 41 in the tip 40 of the probe 24 are placed in communication with the pressure changing means 27 by a channel 42.

In order to determine the degree of permeability of the formation 14, the fluid pressure at the tip 40 of the probe 24 is changed creating a pressure gradient in the formation 14 extending at least to the tip 30 of the probe 25. In order to accomplish this, the fluid content of the formation 14 is changed through the openings 41 in the tip of the probe 24, this being done after an equilibrium pressure has been reached at the tip 30 of the probe 25 as measured by the pressure responsive device 26 and the static pressure differential $P_1$ between the formation fluid and, for example, the drilling liquid has been noted at the indicating device 36. The fluid content of the formation is preferably changed by injecting into the formation a fluid having substantially the same hydraulic characteristics as the fluid already present in the formation material near the wall of the bore hole. Thus when water base drilling liquids are employed, the fluid might be water; when oil base drilling liquids are employed, the fluid might be oil.

The fluid is preferably injected into the formation 14 from the probe 24 at a constant predetermined or measured rate of flow by means of apparatus described more fully below. As a result of this constant fluid flow, the pressure at the tip of the probe 25 will increase to a new steady value. This increase in pressure is determined by measuring the new pressure differential $P_2$ between the tip 30 of probe 25 and the drilling liquid 11 in the bore hole by means of the pressure responsive device 26 and the indicating device 36 at the surface. The difference in pressure differentials $P_2 - P_1$ is a direct function of the permeability of the formation 14. Qualitatively, by comparison with tests made by the same device in other formations, the relative permeability of the formation 14 may be readily observed by the increase in pressure $P_2 - P_1$ at the probe 25 due to a predetermined, constant-rate fluid flow through the probe 24.

On the other hand, the actual permeability of the formation 14 may be readily computed from data obtained in accordance with the invention. The permeability $c$ in darcies of a formation is given by the following relation:

$$c = \frac{K\sigma q}{4\pi d \Delta P}$$

wherein:

$\sigma$ is the viscosity of the fluid passing through the probe 24, in centipoises;

$\Delta P$ is the increase or decrease in pressure $P_2 - P_1$ in kilograms per square centimeter;

$q$ is the flow of this fluid in cubic centimeters per second;

$d$ is the distance between the tips of the probes 24 and 25 in centimeters; and K is a geometric coefficient.

The geometric coefficient K is equal to 1 if the probes are very long with respect to the distance $d$. On the other hand, if the probes are short with respect to distance $d$, the coefficient becomes nearer to 2. The coefficient K may be predetermined experimentally for a given tool. Thus it can be seen that convenient methods and apparatus are provided for determining the relative and/or the actual permeabilities of formations traversed by a bore hole.

The constant fluid flow through the probe 24 may be obtained, controlled and measured in any convenient manner. For example, as shown in Figure 2 the pressure changing means 27 comprises a cylindrical chamber 43 in the housing 16 to contain the desired fluid in its lower part. This fluid, as indicated above, may be water or oil of known viscosity, and is preferably injected into the formation at substantially the same temperature as the liquid present in the bore hole. To this end the walls of the chamber 43 are preferably thermally conductive. For accurate permeability determinations this temperature, if not known, should be measured at the test level. The upper portion of the chamber 43 may be placed in communication with the bore hole to receive liquid therefrom by means of a port 44 in the housing 16. The upper and lower portions of the chamber 43 are separated by a floating piston 45. An electrically controlled valve 46 may be inserted in the channel 42 which connects the probe 24 to the chamber 43, in order to control the flow of fluid. The valve 46 is controlled from the surface of the earth by means of a switch 47 which connects an electrical source 48 to the valve through a cable conductor 49. Normally the valve 46 is closed whereby no fluid from within chamber 43 may pass through the probe 24. However, upon closing the switch 47 at the surface, the valve 46 will be opened, thereby opening the channel 42 to the flow of fluid from the chamber 43. A conventional flowmeter 50 may also be inserted in the channel 42 in order to determine the rate of fluid flow from the probe 24 into the formation 14. The flowmeter 50 preferably gives an electrical output through a pair of insulated conductors 51 and 52, which is a direct function of the fluid flow. The conductors 51 and 52 are connected to an indicating device such as a galvanometer 53 which preferably makes a continuous record of fluid flow as a function of time.

Thus, when the probes 24 and 25 have been inserted into the formation 14 and the static differential pressure $P_1$ recorded, the valve 46 is opened providing an open channel between the fluid in the lower portion of the chamber 43 and the openings 41 in the probe 24. Since the fluid pressure in the formation 14 will be less than the pressure of the drilling liquid at the same level, this difference in pressure applied across the piston 45 will cause the liquid to flow into the formation 14 at a substantially constant rate. As soon as the tests have been completed, the switch 47 may be re-opened, thus stopping the current flow through the conductor 49 and reclosing the valve 46.

It will be understood that the constant fluid flow into the permeable formation may be obtained in any other convenient manner, as for example by a conventional electrical pump, or from a chamber similar to chamber 43 in Fig. 2, but wherein the portion above piston 45 is closed and is filled with gas a high pressure.

In permeability determinations wherein the actual formation pressure is not desired, it may be preferable to employ the formation pressure as the base and thus obtain a direct indication of the differential pressure $\Delta P$. To this end the channel 32, connected to one side of the pressure responsive device 26 could be connected to a third probe (not shown) in the formation 14 at a relatively great distance from the probe 24, whereby the pressure at the third probe is substantially unaffected by the flow of fluid from the probe 24. Thus the device 26 will give a direct indication of $\Delta P$, the difference in pressure between the probe 25 and the third probe.

Alternatively, the third probe need not be located at a great distance from the probe 24 but may be located within the influence of the fluid flow and in the same plane as the probes 24 and 25, and at a greater distance from the probe 24 than the probe 25. The differential pressure between the third probe and the probe 25 may be indicated by the pressure responsive device 26 and used in the relation given above. However, a different geometrical coefficient K would have to be determined experimentally.

In a specific example with the device shown in Figure 1, having a spacing $d$ equal to 4 centimeters and a $K \cong 1$, and having a fluid flow of water at 5 cubic centimeters per second at a viscosity of one centipoise, an increase in pressure $\Delta P$ of 1 kilogram per square centimeter indicates a formation having a permeability of 100 millidarcies.

In order that the probes 24 and 25 might be effectively inserted into the formation the housing may be fitted with movable back-up members 54 and 55. The back-up members 54 and 55 may be pressed against the wall of the bore hole 10 and the probes 24 and 25 inserted into the formation 14 in any convenient manner. For example, back-up members 54 and 55 may be provided with pistons 56 and 57 which fit snugly in cylinders 58 and 59, respectively. Appropriate stop means 60 and 61 may be employed to keep the piston 56 and 57 from being released from the cylinders 58 and 59 when fully extended. The probes 24 and 25, passing through the ports 17 and 18 in the housing 16 may be attached to a piston 62 adapted to ride in a chamber 63. The cylinder 58, the chamber 63 and the cylinder 59 behind the pistons 56, 62 and 57, respectively, are interconnected by fluid channels 64 and 65 providing hydraulic communication therebetween.

This hydraulic system may be filled with an incompressible liquid such as oil and connected by means of a channel 66 to an electric pump 67, which is adapted to pump the liquid into or out of the system as desired. An auxiliary cylinder 68 provides a chamber for the incompressible liquid. A floating piston 69 is disposed in the cylinder 68 and a channel 70 may provide communication from the bore hole to a position beneath the piston 69. The pump 67 may be connected by an electrical circuit 71 to a suitable source of electric power 72 at the surface of the earth. A current reversing switch 73, having contacts 74, 75 and 76, and an ammeter 77, are in the circuit with the source 72 and the pump 67.

As the housing 16 is passed through the bore hole 10, the pistons 56, 57 and 62 remain retracted in their respective cylinders and the switch 73 may be connected to the neutral contact 75. When the housing 16 is stopped opposite the permeable formation 14, the switch 73 may be moved to the contact 74, causing the pump 67 to force incompressible liquid under pressure to the cylinders 58, 59 and 63, thrusting the back-up arms 56 and 57 against the wall of the bore hole in one direction and inserting the probes 24 and 25 into the formation 14 in the opposite direction. The total end surface area of the pistons 56 and 57 should be larger than the area of the piston 62 to insure that the housing 16 will be thrust against the wall of the bore hole. By timing or by noting an overload increase in the ammeter 77, the operator will be informed when the pistons have been forced to the fullest possible extent, at which time it will be known that the probes have been inserted into the formation a preestablished distance, i. e. the full probe length.

As soon as the pressure and permeability tests have been completed at the formation 14 and it is desired to remove the housing 16 from the bore hole 10 or to a new location for additional tests, the switch 73 may be moved to the contact 76 and thus reverse the direction of pumping action by the pump 67. This will cause the back-up members 54 and 55, and the probes 24 and 25 to be retracted. If desired, retracting springs 78, 79 and 80 may be provided in the cylinders 58 and 59, and the chamber 63, respectively, to insure positive retracting action and to maintain the members 24, 25, 54 and 55 in retracted positions while the housing 16 is being moved from one location to another.

The fluid channels 28 and 42 may maintain communication between the tips of the probes 25 and 24 during the expansion and retraction operation in any convenient manner. For example, as shown in Figures 2 and 2B, collapsible, pressure tight telescoping tubes 81 and 82 may be provided in the chamber 63.

In order that the several electrical conductors 37, 38, 49, 51, 52 and 71, which are shown schematically in Figure 2 as extending radially outwardly from their respective power and control devices within the housing 16, might be conveniently connected to the cable 19 at the upper end of the housing, the housing may be formed with a helical groove 83 to receive the conductors at the points at which they enter the housing.

As indicated above, the mud cake 39 is practically impermeable and thus acts as an almost perfect barrier to the flow of fluid from the probe 24 to the bore hole 10, making the pressure distribution about the probe 24 for a constant flow of a given fluid almost entirely a function of the permeability of the formation 14. For isotropic formations the pressure distribution about the probe 24 will be uniform and the permeability measurements made with the apparatus shown in Figure 2 will represent substantially the true permeability of the formation 14. However, many formations may be hydraulically anisotropic, and thus will have different permeabilities in vertical and lateral directions. In Figure 2 if the formation 14 is hydraulically anisotropic, the measurements obtained by means of the vertically disposed probes 24 and 25 will represent substantially the apparent vertical permeability of the formation.

In accordance with the invention, measurements may be made by means of horizontally disposed probes and the apparent horizontal permeability obtained by apparatus similar to that shown in Figure 2. Preferably, however, vertical and horizontal measurements are made simultaneously as, for example, with the apparatus shown in Figure 3. In Figure 3, a portion of a housing 16' is shown having three probes 24', 25' and 84 which are adapted to be inserted into a formation in substantially the same manner as the probes shown in Figure 2. The probes 24' and 25' are in a vertical plane and the probes 24' and 84 are in a horizontal plane. The spacing between the tips of the probes 24' and 25' and between the tips of the probes 24' and 84 are preferably substantially the same. A constant predetermined fluid flow is passed from the tip of the probe 24', and the increases in differential pressure in the vertical and horizontal directions measured respectively at the probes 25' and 84. By comparing these measurements the degree of hydraulic anisotropy of the formation will be readily apparent.

Rather than measuring the pressure differentials between the probes 25' and 84, respectively, and a reference source, the differential pressure between the probes 25' and 84 could be measured directly as the fluid is passed from the probe 24', any difference in pressure between these probes being a direct indication of the hydraulic anisotropy of the measured formation.

It has been found that the likelihood of the probe ports, such as the ports 29 and 41 in the probes 25 and 24 of Figure 2, becoming clogged is reduced by the use of the enlarged probe tips 30 and 40 which serve to form small cavities between the ports and the formation. If desired, however, highly permeable plugs, such as sintered metal discs might be inserted in the ports as a further precaution against clogging.

It will be understood that the specific embodiments disclosed herein are susceptible of numerous modifications in form and detail within the scope of the invention. For example, the measuring point for the static pressure in the formation and the point at which the pressure gradient is established might be made substantially coincident, as by using a single probe duct for both functions. If a single probe is employed for both functions, a pressure differential might be applied to the fluid and this pressure and the fluid flow measured as a function of the permeability of the formation. Alternatively, a single probe having multiple ducts might be used.

Also, as stated the pressure gradient in the formation may be established in any one of several ways, as by introducing fluid into or withdrawing fluid from a particular part of the formation by unidirectional fluid flow. Alternatively, alternating fluid flow may be employed, in which case the differential pressure would appear as a modulation on the static pressure, which could be readily separated.

It will be understood also that the back-up arms shown in Figure 2 need not be employed, but in their stead could be used a permanent spring arrangement to maintain the housing against the wall of the bore hole. Also, the probe carrier assembly might be modified by utilizing individually movable probes. Therefore, the embodiments described and shown in the accompanying drawing are not to be regarded as limiting the scope of the appended claims.

I claim:

1. In a method for ascertaining a hydraulic characteristic of a geological formation traversed by a bore hole, the steps of forming a confined flow channel between the bore hole and a point within the formation, passing fluid through the channel for creating a pressure gradient substantially surrounding said point within the formation, and determining the difference in pressure between said point and a reference point, thereby to derive information indicative of the desired characteristic.

2. In a method for ascertaining a hydraulic characteristic of a geological formation traversed by a bore hole, the steps of determining the static pressure of the formation at a representative point within the formation, forming a confined flow channel between the bore hole and a second point within the formation, passing fluid through the channel for establishing at said second point within the formation a predetermined pressure differential with respect to the static pressure whereby a pressure gradient is created in the vicinity of the representative point, and determining the change in pressure at the representative point resulting from the pressure gradient, thereby to derive information indicative of the desired characteristic.

3. In a method for ascertaining a hydraulic characteristic of a geological formation traversed by a bore hole, the steps of forming a confined flow channel between the bore hole and a point within the formation, passing fluid through the channel for causing fluid flow in the formation at said first point, and detecting fluid pressures in the formation at second and third points, at least one of which is spaced from the first point by a measured distance within the formation and within the range of distances influenced by the fluid flow in the formation at the first point, thereby to derive information indicative of the desired characteristic.

4. In a method of ascertaining a hydraulic characteristic of a geological formation traversed by a bore hole, the bore hole being filled with liquid and the bore hole wall being covered by a substantially impermeable mud cake, the steps of introducing fluid into the formation at a first point in the formation, establishing a second point in the formation spaced a known distance from the first point, and measuring the change in pressure differential across the mud cake based upon the pressure change at the second point as caused by the fluid introduced at the first point, thereby to derive information indicative of the desired characteristic.

5. In a method of ascertaining a hydraulic characteristic of a geological formation traversed by a bore hole, the bore hole wall being covered by a substantially impermeable mud cake and the bore hole containing a column of liquid having a static pressure adjacent the formation exceeding the static pressure of the formation, the steps of utilizing the pressure differential across the mud cake to introduce a fluid into the formation at a first point behind the mud cake at a known rate of flow, establishing a second point in the formation spaced from the first point by a known distance within the range of distances influenced by the fluid introduced at the first point, and measuring the pressure differential across the mud cake between the second point and a reference point to determine the change in pressure differential caused by the introduction of the fluid at the first point, thereby to derive information indicative of the desired characteristic.

6. Apparatus for operating in a bore hole comprising a housing adapted to enter the bore hole, means carried by the housing for establishing a flow of fluid in a formation traversed by the bore hole including a member and means for inserting said member in the formation to establish the fluid flow at a first point therein, and means at least partially carried by the housing for measuring the change in pressure within the formation at a second point resulting from the fluid flow, said member and said measuring means being positioned to establish the first and second points at a known distance from each other through the formation.

7. Apparatus for operating in a bore hole comprising a housing adapted to be lowered into a bore hole, a plurality of spaced apart probes each containing a fluid conduit mounted in the housing, means for inserting said probes in a formation traversed by the bore hole, a fluid source connected to the fluid conduit in a first of said probes, control means for causing, through said first probe, a fluid flow in the formation at a known rate, and pressure responsive means coupled to the fluid conduit in a second of the probes for measuring the fluid pressure in the formation at said second probe spaced from said first probe by a known distance.

8. Apparatus for operating in a bore hole as set forth in claim 7, said first probe and said second probe being spaced apart horizontally in the formation, said plurality of probes including a third probe spaced vertically from said first probe, the fluid conduit in said third probe being coupled to a pressure responsive device, whereby the pressure changes which occur in the formation at the second and third probes as a result of the fluid flow in the formation at the first probe may be determined.

9. Apparatus for operating in a bore hole, comprising a housing adapted to be disposed in a bore hole, a probe carried by the housing, means for inserting said probe in formations traversed by the bore hole, means for introducing a fluid in measured quantities into the formation at a first point through said probe, and pressure responsive means at least partially carried by the housing, means for transmitting the pressure at a second point in the formation to said pressure responsive means for measuring the pressure at the second point in the formation spaced a measured distance from the first point to ascertain the pressure change which occurs at the second point as a result of the introduction of fluid at the first point.

10. Apparatus as set forth in claim 9, said first and second points being spaced apart horizontally, and means at least partially carried by the housing for measuring the pressure change which occurs at a third point in the formation spaced vertically from the first point.

11. Apparatus for operating in a bore hole comprising a housing adapted to be disposed in a bore hole, a plurality of probes each containing a fluid conduit carried by the housing, means for inserting said probes in formations traversed by the bore hole, means for introducing a fluid at a first point in the formation at a known rate through the fluid conduit in a first of said probes, pressure responsive means at least partially carried by the housing coupled to the fluid conduit in a second of the probes for measuring the pressure in the formation at a second point, said first and second probes being positioned to establish the first and second points at measured distances apart in the formation.

12. Apparatus as set forth in claim 11, said first and second points being spaced apart horizontally, said plurality of probes including a third probe to establish a third point in the formation for measurement of pressure, the fluid conduit in said third probe being coupled to second pressure responsive means, said third point being spaced vertically from the first point.

13. Apparatus for operating in a bore hole comprising a housing adapted to be lowered into a bore hole, a plurality of probes each containing a fluid conduit mounted in the housing for movement between extended and withdrawn positions, driving means in the housing for moving the probes outwardly to their extended positions, backing-up means carried by the housing on the opposite side from the probes including abutment means movable between extended and withdrawn positions, driving means in the housing for moving the abutment means to its extended position to engage the bore hole wall and urge the housing against the opposite wall so that the housing engages the wall in the vicinity of the probes, the probes in their extended positions penetrating the bore hole to enter the formation, duct means connecting the fluid conduit in one probe with a source of fluid to be injected into the formation, pressure responsive means, and duct means connecting the fluid conduit in a second probe to said pressure responsive means.

14. Apparatus for operating in a bore hole comprising first probe means containing a fluid conduit for entering a formation traversed by the bore hole, and pressure responsive means coupled to the fluid conduit in the first probe means comprising a first chamber, a movable barrier in the chamber, duct means connecting the conduit in the first probe means and one side of the chamber to establish the fluid pressure of the formation in the chamber, second duct means connecting the other side of the chamber to the exterior of the apparatus to receive bore hole fluid which surrounds the apparatus, and means responsive to displacement of the movable barrier for providing electrical signals representative of a pressure characteristic of the formation.

15. Apparatus for operating in a bore hole, comprising an elongated housing adapted to be lowered into a bore hole, a probe carried by the housing means for extending the probe from the housing for insertion in a formation traversed by the bore hole, means forming a fluid conduit in the member communicating between the housing and at least one point on the probe which is adapted to be inserted in the formation, a fluid source in the housing, and duct means in the housing for connecting the fluid source to the fluid conduit for establishing a flow of fluid through the conduit into the formation.

16. Apparatus as set forth in claim 15, including valve means in the duct means, the valve means being controlled from the surface of the earth for controlling the fluid flow into the formation.

17. Apparatus as set forth in claim 15, including fluid metering means at least partially carried by the housing and connected to the duct means for measuring the flow of fluid through the conduit into the formation.

18. Apparatus as set forth in claim 15, wherein the fluid source includes a fluid reservoir carried by the housing and coupled by the duct means to the conduit.

19. Apparatus as set forth in claim 18, including an imperforate, movable member disposed in the reservoir and dividing the reservoir into two parts, second duct means on one side of the movable member placing one part of the reservoir in communication with the bore hole, the other part of the reservoir being coupled by the duct means to said conduit.

20. Apparatus as set forth in claim 19, including a valve in the duct means controlled from the surface of the earth for controlling the fluid flow from the reservoir to the conduit.

21. Apparatus as set forth in claim 19, including fluid metering means at least partially carried by the housing and connected to the duct means for measuring the flow of fluid into the formation from the reservoir.

22. Apparatus for operating in a bore hole comprising first and second probe means each containing a fluid conduit, means for inserting said first probe in a formation at a first point, pressure responsive means coupled to the fluid conduit in the first probe means comprising a first chamber, a movable barrier in the chamber, duct means connecting the conduit in said first probe means and one side of the chamber to establish the fluid pressure of the formation in the chamber, second duct means connecting the other side of the chamber to the fluid conduit in said second probe means, means for inserting said second probe means in the formation at a point spaced from the first point to establish a reference pressure source within the formation, and means responsive to displacement of the movable barrier for providing electrical signals representative of a pressure characteristic of the formation.

References Cited in the file of this patent

UNITED STATES PATENTS

| | | |
|---|---|---|
| 2,126,575 | Ranney | Aug. 9, 1938 |
| 2,198,821 | Jessup | Apr. 30, 1940 |
| 2,284,707 | Wilson | June 2, 1942 |
| 2,345,935 | Hassler | Apr. 4, 1944 |
| 2,360,886 | Osterberg | Oct. 24, 1944 |
| 2,375,865 | Nebolsine | May 15, 1945 |
| 2,381,929 | Schlumberger | Aug. 14, 1945 |
| 2,521,976 | Hays | Sept. 12, 1950 |
| 2,607,220 | Martin | Aug. 19, 1952 |
| 2,612,346 | Nelson | Sept. 30, 1952 |

FOREIGN PATENTS

| | | |
|---|---|---|
| 722,745 | Germany | July 20, 1942 |